United States Patent
Garin et al.

(10) Patent No.: US 9,329,036 B2
(45) Date of Patent: May 3, 2016

(54) MOBILE DEVICE POSITIONING BASED ON INDEPENDENTLY OBTAINED BAROMETRIC PRESSURE MEASUREMENTS

(71) Applicant: QUALCOMM Incorporated, San Diego, CA (US)

(72) Inventors: Lionel Jacques Garin, Palo Alto, CA (US); Sai Pradeep Venkatraman, Santa Clara, CA (US); Gengsheng Zhang, Cupertino, CA (US); Weiyi Liu, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 14/187,090

(22) Filed: Feb. 21, 2014

(65) Prior Publication Data

US 2015/0241213 A1 Aug. 27, 2015

(51) Int. Cl.
| | |
|---|---|
| *G01C 5/00* | (2006.01) |
| *G01C 5/06* | (2006.01) |
| *G01C 21/20* | (2006.01) |
| *G01S 5/02* | (2010.01) |
| *G01S 19/49* | (2010.01) |

(52) U.S. Cl.
CPC ........ *G01C 5/005* (2013.01); *G01C 5/06* (2013.01); *G01C 21/206* (2013.01); *G01S 5/0257* (2013.01); *G01S 19/49* (2013.01)

(58) Field of Classification Search
None
See application file for complete search history.

(56) References Cited

U.S. PATENT DOCUMENTS

| | | | |
|---|---|---|---|
| 6,970,795 B1 | 11/2005 | Burgett et al. | |
| 7,873,375 B2 | 1/2011 | Annunziato et al. | |
| 8,543,351 B2 | 9/2013 | Yuen et al. | |
| 2007/0218823 A1 | 9/2007 | Wolf et al. | |
| 2012/0013475 A1 | 1/2012 | Farley et al. | |
| 2012/0022784 A1 | 1/2012 | Louis et al. | |
| 2012/0072110 A1 | 3/2012 | Venkatraman | |
| 2012/0083705 A1* | 4/2012 | Yuen ............... | A61B 5/0002 600/508 |
| 2013/0142361 A1* | 6/2013 | Lim ................. | H03G 3/3005 381/107 |
| 2013/0204567 A1 | 8/2013 | Nieminen et al. | |
| 2015/0133145 A1* | 5/2015 | Palanki ............. | H04W 4/025 455/456.1 |
| 2015/0247917 A1* | 9/2015 | Gum ................. | G01C 5/06 342/452 |
| 2015/0319578 A1* | 11/2015 | Edge ................ | H04W 4/025 455/456.6 |

FOREIGN PATENT DOCUMENTS

DE   102009002314 A1   7/2010

OTHER PUBLICATIONS

International Search Report and Written Opinion—PCT/US2015/016972—ISAEPO—May 22, 2015.

(Continued)

*Primary Examiner* — Andre Allen
(74) *Attorney, Agent, or Firm* — Berkeley Law & Technology Group LLP

(57) ABSTRACT

Various techniques are provided which may be implemented as methods, apparatuses and articles of manufacture for use by a mobile device. In certain example implementations, a mobile device may process a barometric pressure measurement indicative of an altitude effect and a weather effect to determine a first parameter corresponding to the altitude effect and a second parameter corresponding to the weather. Such a mobile device may further determine whether it may be transitioning or may have transitioned from an initial level to another level of a multiple level structure based, at least in part, on the first and second parameters.

30 Claims, 4 Drawing Sheets

(56) References Cited

OTHER PUBLICATIONS

PCT/US2015/016972: Second Written Opinion of the International Preliminary Examining Authority, Jan. 29, 2016, 6 pages.

PCT/US2015/016972: Response to Second Written Opinion of the International Preliminary Examining Authority, Mar. 3, 2016, 17 pages.

* cited by examiner

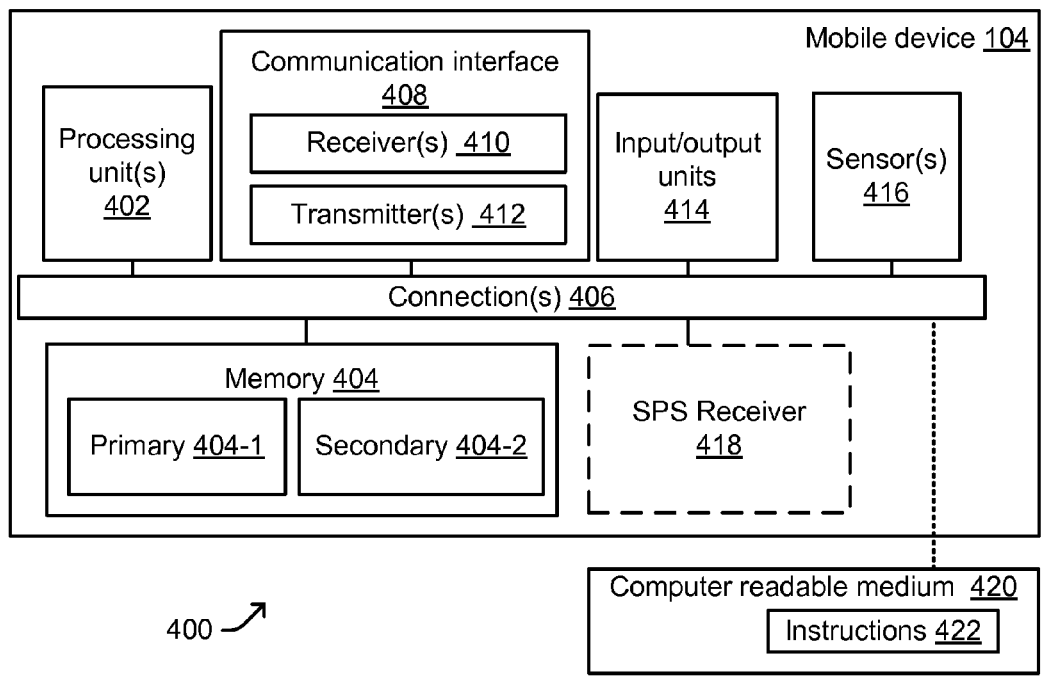
FIG. 4
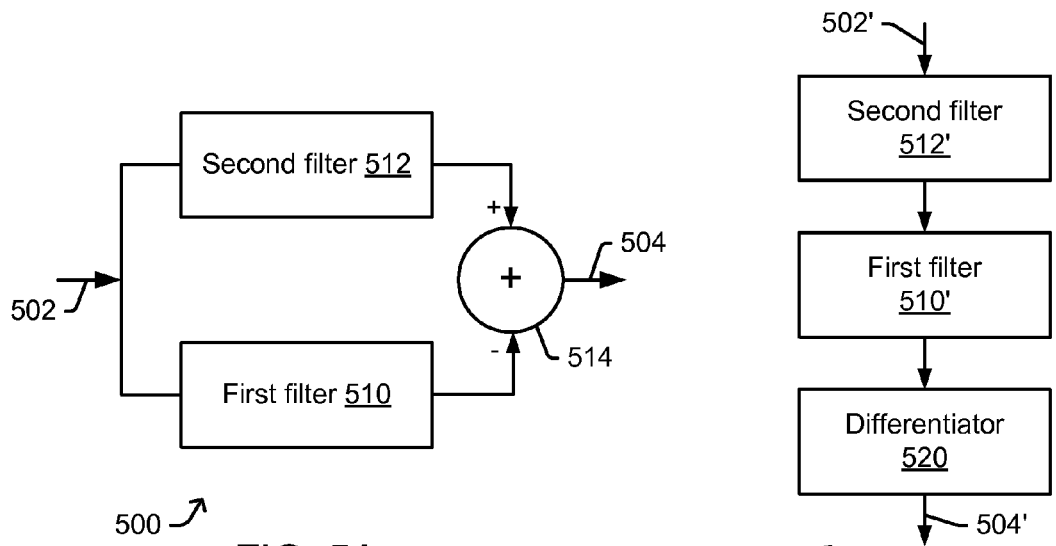
FIG. 5A
FIG. 5B

MOBILE DEVICE POSITIONING BASED ON INDEPENDENTLY OBTAINED BAROMETRIC PRESSURE MEASUREMENTS

BACKGROUND

1. Field

The subject matter disclosed herein relates to electronic devices, and more particularly to methods, apparatuses and articles of manufacture for use by and/or in a mobile device to provide for positioning based, at least in part, on independently obtained barometric pressure measurements.

2. Information

As its name implies, a mobile device may be moved about, e.g. typically being carried by a user and/or possibly a machine. By way of some non-limiting examples, a mobile device may take the form of a cellular telephone, a smart phone, a tablet computer, a laptop computer, a wearable computer, a navigation and/or tracking device, etc.

Certain mobile devices may be enabled to receive location based services through the use of location determination technology including satellite positioning systems (SPS'), indoor location determination technologies and/or the like. In particular implementations, a mobile device may be provided with positioning assistance data to enable the mobile device to estimate its location using one or more positioning techniques or technologies.

In particular implementations of indoor navigation applications, it may be useful to determine an altitude of a mobile device. This may be particularly useful in navigating multi-level environments in which a mobile device may be provided with navigation assistance data such as locations of wireless signal transmitting devices, radio heatmaps, digital electronic maps, routing graphs, etc. As navigation assistance data for navigating an entire multi-level structure may be voluminous, a mobile device may only be provided with localized navigation assistance data depending, for example, on the general location of the mobile device (e.g., particular floor or wing of a building). In a particular implementation, a mobile device may be determined to be located on a particular level of a structure using one or more positioning techniques, and provided with navigation assistance data for use on that particular region.

In a particular implementation, a mobile device may resolve its location as being at particular level of a building by acquiring signals transmitted by transmitting devices positioned at known locations. For example, a mobile device may acquire a MAC address or other information modulating a signal transmitted by a transmitting device (e.g., IEEE std. 802.11 access point device, etc.) that is in range of the mobile device to infer that the mobile device is relatively close to the transmitting device located on a particular building floor. This technique, however, may be unreliable if a particular transmitting device transmits a wireless signal that may be acquired by a mobile device on different floors of the building.

In another particular implementation, mobile device may resolve its location as being a particular floor of a building by determining its altitude by comparing local barometric pressure measurements, e.g., obtained using on board barometric pressure sensor and/or the like, to a known reference barometric pressure corresponding to a reference altitude. However, such a reference barometric pressure is typically provided to the mobile device by some external source (e.g., a server) and typically has a limited period of relevance.

SUMMARY

In accordance with certain aspects, a method may be provided which comprises, at a mobile device: obtaining a signal representing a barometric pressure measurement indicative of an altitude effect and a weather effect; determining, from the signal, a first parameter corresponding to the altitude effect during a first period of time; determining, from the signal, a second parameter from the signal corresponding to the weather effect during a second period of time; and determining whether the mobile device is transitioning or has transitioned from an initial level to another level of a multiple level structure based, at least in part, on the first parameter and the second parameter.

In accordance with certain other aspects, a mobile device may be provided which comprises: a sensor to generate a signal representing a barometric pressure measurement indicative of an altitude effect and a weather effect; and a processing unit to: determine, from the signal, a first parameter corresponding to the altitude effect during a first period of time; determine, from the signal, a second parameter from the signal corresponding to the weather effect during a second period of time; and determine whether the mobile device is transitioning or has transitioned from an initial level to another level of a multiple level structure based, at least in part, on the first parameter and the second parameter.

In accordance with still other aspects, an apparatus may be provided for use in a mobile device, which comprises: means for obtaining a signal representing a barometric pressure measurement indicative of an altitude effect and a weather effect; means for determining a first parameter, from the signal, corresponding to the altitude effect during a first period of time; means for determining a second parameter, from the signal, corresponding to the weather effect during a second period of time; and means for determining whether the mobile device is transitioning or has transitioned from an initial level to another level of a multiple level structure based, at least in part, on the first parameter and the second parameter.

In accordance with some other aspects, an article of manufacture may be provided which comprises a non-transitory computer readable medium having stored therein computer implementable instructions executable by a processing unit of a mobile device to: obtain a signal representing a barometric pressure measurement indicative of an altitude effect and a weather effect; determine a first parameter, from the signal, corresponding to the altitude effect during a first period of time; determine a second parameter, from the signal, corresponding to the weather effect during a second period of time; and determine whether the mobile device is transitioning or has transitioned from an initial level to another level of a multiple level structure based, at least in part, on the first parameter and the second parameter.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 4 is a schematic diagram illustrating certain features of an example computing platform that may be provisioned within a mobile device, e.g., as in FIG. 1, in accordance with certain example implementations.

FIG. 5A and FIG. 5B are schematic diagrams illustrating certain example filter arrangements that may be implemented in a mobile device, e.g., as in FIG. 1, in accordance with certain example implementations.

DETAILED DESCRIPTION

Figure 1:
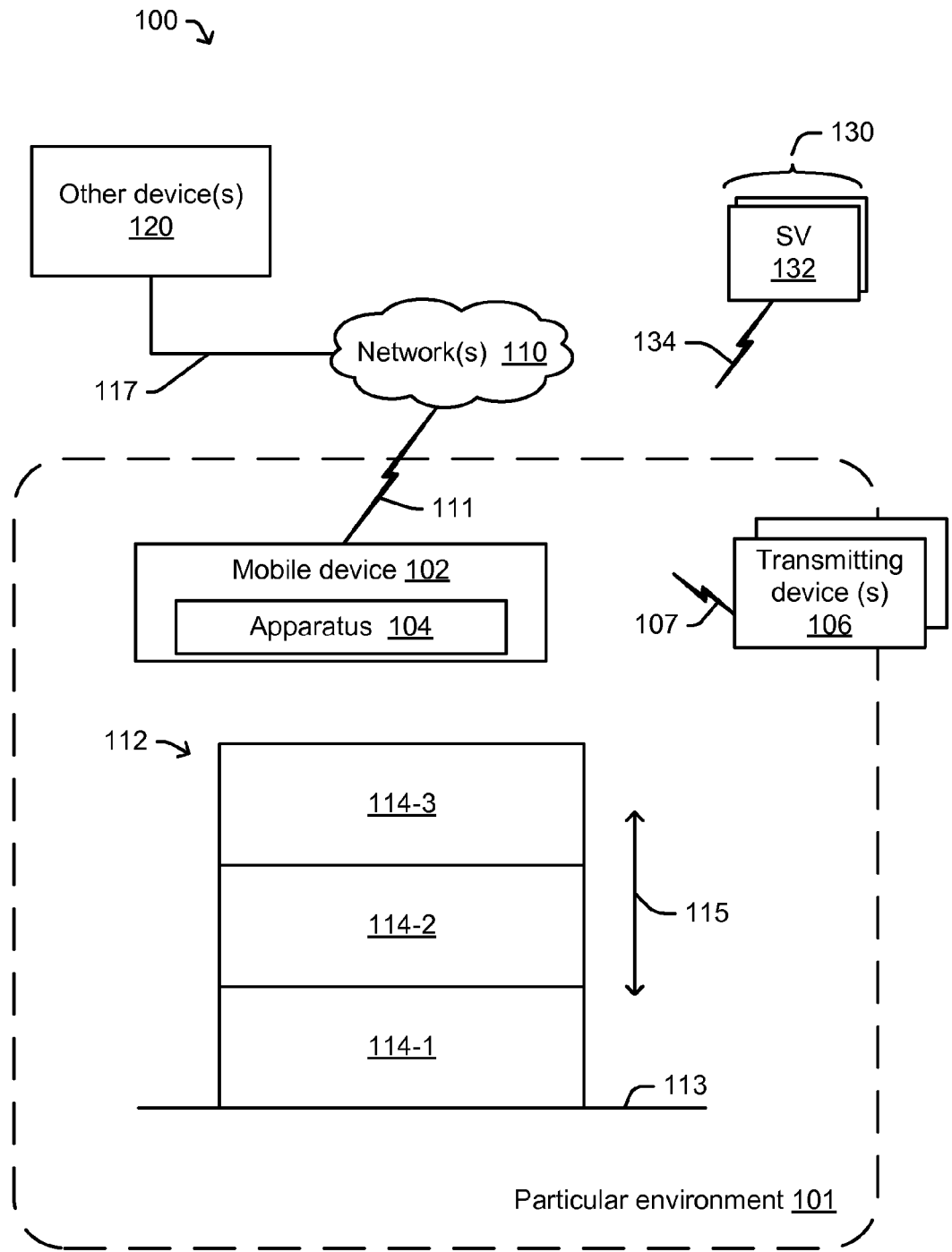
FIG. 1 is a schematic block diagram illustrating an example arrangement of representative electronic devices including an example mobile device that may be configured to independently obtain barometric pressure measurements for use in mobile device positioning, in accordance with certain example implementations.

Various example techniques are provided herein which may be implemented at a mobile device to support positioning capabilities, at least in part, by allowing the mobile device to make use of local barometric pressure measurements without the need of a reference barometric pressure and/or other like barometric pressure information from one or more other devices.

As described in greater detail herein, in certain example implementations a mobile device may obtain one or more electrical signals representing one or more (local) barometric pressure measurements. For example, a mobile device may comprise a barometric sensor and/or other like circuitry capable of generating one or more electrical signals responsive to changes in a barometric pressure of an atmosphere surrounding the mobile device. In certain example implementations, an electrical signal representing a barometric pressure measurement may be indicative of a sensed barometric pressure. However, in certain other example implementations, an electrical signal representing a barometric pressure measurement may comprise data from a sensor (e.g., raw data, etc.) that may be processed (e.g., by a processing unit and/or other circuitry within the mobile device using known techniques applicable to the sensor) to be indicative of a sensed barometric pressure.

A barometric pressure may change overtime as a result of changes in atmospheric weather conditions, and/or as a result of changes in an altitude of the mobile device within the atmosphere. Accordingly, in certain instances, one or more of the electrical signals representing one or more barometric pressure measurements may be indicative of contributions relating to a weather effect and an altitude effect.

In accordance with certain example implementations, a mobile device may determine a first parameter based on a portion of such electrical signals indicative of or otherwise corresponding to the altitude effect. For example, in certain instances, a first filter may be used to determine a first parameter based, at least in part, on barometric pressure measurements obtained during a first period of time. The mobile device may further determine a second parameter indicative of or otherwise corresponding to the weather effect. For example, in certain instances, a second filter may be used to determine a second parameter based, at least in part, on barometric pressure measurements obtained during a second period of time. By way of example, a first filter may comprise a Kalman filter and/or the like, and a second filter may comprise an exponential moving average filter and/or the like.

Accordingly, in certain instances, a first parameter may be substantially indicative of changes in barometric pressure measurements corresponding to a likely change in an altitude of the mobile device during a first period of time, and a second parameter may be is substantially indicative of changes in barometric pressure measurements corresponding to a likely change in an atmospheric weather condition during a second period of time.

In certain example implementations, a first set of barometric pressure measurements may be obtained which correspond to a first period of time and a second set of barometric pressure measurements may be obtained which correspond to a second period of time. In certain instances, a second set of barometric pressure measurements may comprise all or part of the first set of barometric pressure measurements. In certain instances, a first set and/or a second set of barometric pressure measurements may comprise a plurality of selected samples of barometric pressure measurements from a larger set barometric pressure measurements. In certain instances, a first set and a second set of barometric pressure measurements may comprise a different number of samples of barometric pressure measurements. In certain instances, a first set and a second set of barometric pressure measurements may comprise the same number of samples of barometric pressure measurements.

In certain example implementations, a first period of time may be shorter in duration than a second period of time, e.g., because certain changes in altitude of a mobile device may occur more quickly and hence affect barometric pressure measurements over a shorter duration than might the typically slower ebb and flow of weather conditions that affect barometric pressure. For example, a mobile device may be moved from one floor of a building to an adjacent floor relatively quickly (e.g., via an elevator or even via a staircase) compared to certain movements of lower or higher pressure weather fronts, etc.

In certain instances, a first period of time and/or a second period of time may represent contiguous periods of time. By way of example, a first period of time may correspond to an "A" period of time (e.g., ten seconds, or more or less), and a second period of time may correspond to a "A+B" period of time (e.g., ten seconds plus ten minutes, or more or less). In certain instances, a first period of time and/or a second period of time may represent non-contiguous periods of time. By way of example, a first period of time may correspond to an "A1" period of time and an "A2" period of time. By way of example, a second period of time may correspond to a "B1" period of time, a "B2" period of time, and a "B3" period of time. In certain instances, a second period of time may overlap all or part of at least a portion of a first period of time. Of course, it should be kept in mind that claimed subject matter is not necessarily intended to be limited to any of the examples presented herein.

Having determined such first and second parameters, a mobile device may, for example, determine whether the mobile device is likely transitioning or has likely transitioned from an initial level to another level of a multiple level structure based, at least in part, on the first and second parameters. Thus, for example, a mobile device may compare a threshold value with a difference between the first parameter and the second parameter to determine a likelihood that it has moved from a lower floor to a higher floor in a building. In certain instances, a threshold value may be based, at least in part, on an estimated location of the mobile device, and/or applicable information that may be obtained via an electronic map representing at least a portion of a multiple level structure. For example, an estimated location of the mobile device and/or an electronic map may be useful in determining a vertical distance between levels and/or a corresponding expected change in barometric pressure for such different levels.

In certain example implementations, a mobile device may further determine whether it is likely transitioning or has likely transitioned from one level to another level of a multiple level structure based, at least in part, on one or more signal parameters corresponding to one or more wireless signals received by the mobile device from one or more transmitting devices (e.g., wireless access point devices, etc.).

Attention is drawn next to FIG. 1, which is a schematic block diagram illustrating an example arrangement 100 with a mobile device 102 comprising an apparatus 104 that may be configured to independently obtain barometric pressure measurements for use in mobile device positioning, in accordance with certain example implementations.

Mobile device 102 may, for example, comprise a portable computing device, portable communication device, a portable tracking/location device, and/or the like or some combination thereof. Hence, in certain instances, mobile device 102 may comprise a cellular telephone, a smart phone, a laptop computer, a tablet computer, a navigation device, a wearable computer, a tracking mechanism, just to name a few examples.

As illustrated mobile device 102 may receive wireless signals over a communication link 111 from one or more networks 110, which may be further coupled to one or more other devices 120 via communication link 117. In certain implementations, network(s) 110 may be representative of one or more wireless communication systems, one or more cellular communication systems, one or more wired communication systems, one or more computer networks, all or part of the Internet, an intranet, a local area network, and/or various other computing and/or communication resources/devices/services.

Mobile device 102 may receive wireless signals over communication link 107 from one or more transmitting devices 106, one or more of which may be further coupled together and/or to network(s) 110 (connection not shown). Transmitting device(s) 106 may be representative of variety of different transmitting devices and/or transmitting/receiving devices that may transmit and/or receive wireless signals. In certain implementations, transmitting device(s) 106 may comprise one or more transmitting devices that may be part of or otherwise support network(s) 110 or some portion thereof. Hence, for example, transmitting device(s) 106 may represent a cellular base station, a femtocell device, a pico cell device, a WLAN access point device, a location Beacon device, and/ or the like or some combination thereof, just to name a few examples. Indeed, in certain instances, transmitting device(s) 106 may represent one or more other mobile devices. In accordance with certain aspects, transmitting device(s) 106 may represent any electronic device that may transmit and/or receive wireless signals in support of various computing, communication, location, and/or other like services/capabilities provided or otherwise supported by mobile device 102. As illustrated, one or more transmitting devices 106 may be located within a particular environment 101, and/or otherwise operatively arranged to serve all or part of particular environment 101. By way of example, in certain instances particular environment 101 may comprise a multiple level structure 112. In this example, multiple level structure 112 comprises three different levels, i.e., a level 114-1 that begins at a ground-level 113, a level 114-2 located above level 114-1, and a level 114-3 located above level 114-2. Accordingly, multiple level structure 112 extends in an upward (vertical) direction represented by line 115 from ground-level 113, with each of the levels corresponding to a different altitude. Hence, assuming that multiple level structure 112 is not artificially pressurized, the barometric pressure will vary at each level of multiple level structure 112. For example, as is well known, a barometric pressure at level 114-1 will be slightly greater than a barometric pressure at level 114-2, and still greater than a barometric pressure at level 114-3.

In certain implementations, as shown in FIG. 1, a mobile device 102 may receive or acquire SPS signals 134 from one or more space vehicles (SVs) 132, which may be part of one or more SPS 130. In some embodiments, SPS 130 may be from one global navigation satellite system (GNSS), such as the GPS or Galileo satellite systems. In other embodiments, the SVs 132 may be from multiple GNSS such as, but not limited to, GPS, Galileo, Glonass, or Beidou (Compass) satellite systems. In other embodiments, the SVs 132 may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In certain implementations, mobile device 102 may have circuitry and processing resources capable of computing a position fix or estimated position (e.g., a location) of mobile device 102. For example, mobile device 102 may compute a position fix based, at least in part, on pseudorange measurements to one or more or more the SVs 132. Here, mobile device 102 may compute such pseudorange measurements based, at least in part, on pseudonoise code phase detections in SPS signals 134 acquired from four or more SVs 132. In particular implementations, mobile device 102 may receive from positioning assistance data and/or the like from a server (e.g., represented by other device(s) 116) which may be used to aid in the acquisition of SPS signals 134 including, for example, almanac, ephemeris data, Doppler search windows, just to name a few examples. In certain implementations, similar other types of positioning assistance data may be obtained by mobile device 102 from one or more other devices with regard to one or more transmitting device(s) 106.

In certain example implementations, mobile device 102 may obtain a position fix by processing signals received from terrestrial transmitting device(s) 106 (one or more of which may have fixed and/or otherwise determinable locations) using any one of several techniques such as, for example, advanced forward trilateration (AFLT) and/or OTDOA. In these particular example techniques, a range from mobile device 102 may be measured to one or more or more of such terrestrial transmitters fixed at known locations based, at least in part, on pilot signals transmitted by the transmitting device(s) 106 from fixed otherwise determinable locations and received at mobile device 102. In certain example stations, as mentioned, one or more other device(s) 120 may be capable of providing certain types of positioning assistance data to mobile device 102. By way of example, certain types of positioning assistance data may be indicative of locations and identities of terrestrial transmitting devices, which may facilitate positioning techniques such as AFLT and OTDOA. For example, a server represented by other device(s) 120 may provide all or part of a base station almanac (BSA) and/or the like, which may be indicative of locations and identities of cellular base stations, etc., in a particular region or regions.

In certain instances, one or more other device(s) 116 may provide all or part of an electronic map, and/or other like data files that may support positioning capabilities of mobile device 102. For example, in certain instances, electronic map and/or other like data files may correspond to all or part of particular environment 101, and/or all or part of multiple level structure 112 therein.

In certain In particular environments such as indoor environments or urban canyons, mobile device 102 may not be capable of adequately acquiring SPS signals 134 from a sufficient number of SVs 132 and/or two perform AFLT or OTDOA to compute a position fix from acquisition of signals from applicable outdoor terrestrial transmitting devices. Hence, in certain instances, mobile device 102 may be capable of computing a position fix based, at least in part, on wireless signals acquired from other transmitting devices, e.g., local/indoor transmitting devices (e.g., WLAN access points, femto cell transceivers, Bluetooth devices, etc., which may be positioned at known or otherwise determinable locations). Accordingly, in certain implementations, mobile device 102 may obtain all or part of a position fix by measuring ranges to one or more indoor terrestrial wireless access point devices and/like. Such ranges may be measured, for example, by obtaining a MAC ID address from wireless signals received from such a transmitting device and obtaining range measurements to the transmitting device (e.g., at least in part, by measuring one or more characteristics of the received signals). By way of example, in certain implementations a received signal strength (RSSI), a round trip time (RTT), an angle of arrival (AOA), and/or the like or some combination thereof may be determined/considered. In certain implementations, mobile device 102 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address and/or some other distinctly unique identifier which may be discernible from a signal acquired from a local transmitter), expected RSSI from signals transmitted by the identified local transmitting devices, an expected RTT from the identified transmitting devices, and possibly standard deviations from these expected RSSI or RTT. It should be understood, however, that these are merely examples of values that may be stored in, modeled, and/or otherwise functionally/mathematically represented by a radio heatmap and/or the like, and that claimed subject matter is not limited in this respect.

In addition to measurements obtained from the acquisition of wireless signals from local transmitting devices, according to a particular embodiment, mobile device 102 may further apply a motion model to measurements or inferences obtained from one or more inertial sensors (e.g., accelerometers, gyroscopes, magnetometers, etc.) and/or one or more environment sensors (e.g., temperature sensors, microphones, barometric pressure sensors, ambient light sensors, camera imager, etc.) in estimating all or part of a position and/or a motion state of mobile device 102.

Figure 2:
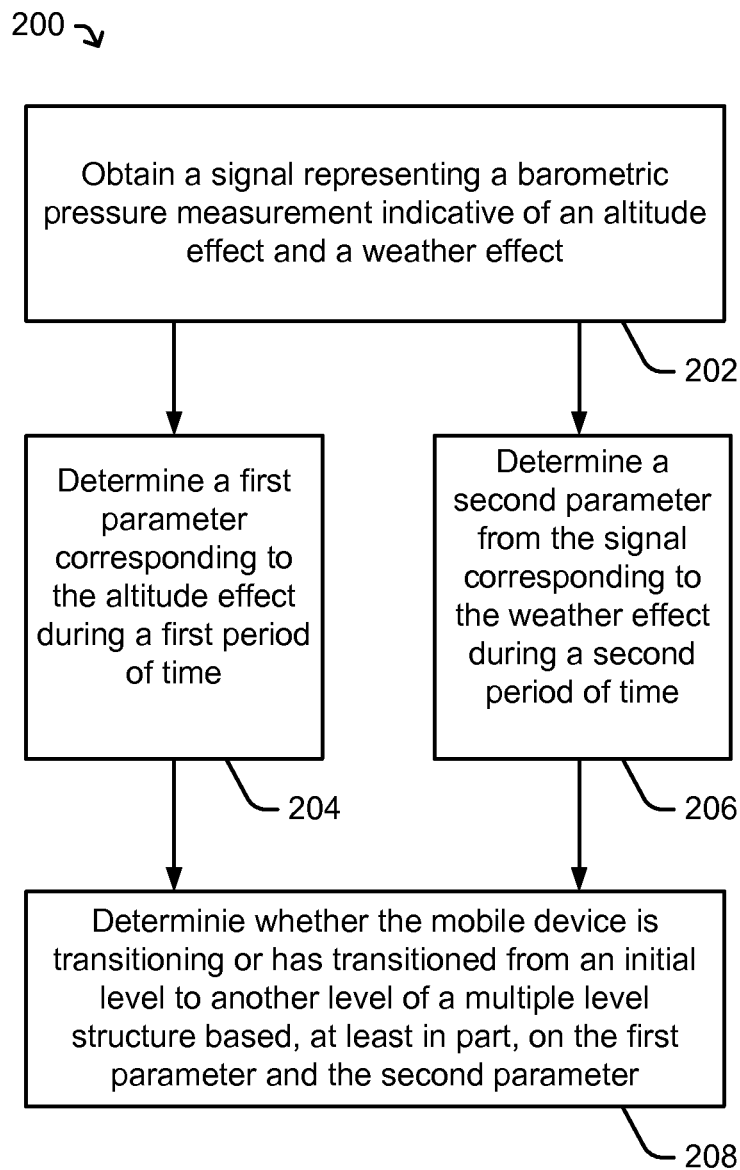
FIG. 2 and FIG. 3 are flow diagrams illustrating some example processes that may be implemented in a mobile device, e.g., as in FIG. 1, to provide for positioning, at least in part, based on local barometric pressure measurements, in accordance with certain example implementations.

Attention is drawn next to FIG. 2, which is a flow diagram illustrating an example process 200 that may be implemented in mobile device 102 and/or apparatus 14, e.g., as in FIG. 1, to provide for positioning, at least in part, based on local barometric pressure measurements, in accordance with certain example implementations.

At example block 202, a signal representing a (local) barometric pressure measurement may be obtained, e.g., from an environment sensor on board the mobile device. As previously mentioned, such a barometric pressure measurement may be indicative of an altitude effect and a weather effect.

At example block 204, a first parameter may be determined which corresponds to an altitude effect during a first period of time. At example block 206, a second parameter may be determined which corresponds to a weather affect during a second period of time.

At example block 208, a determination may be made as to whether the mobile device is transitioning or has transitioned from an initial level to another level of a multiple level structure based, at least in part, on the first and second parameters.

Figure 3:
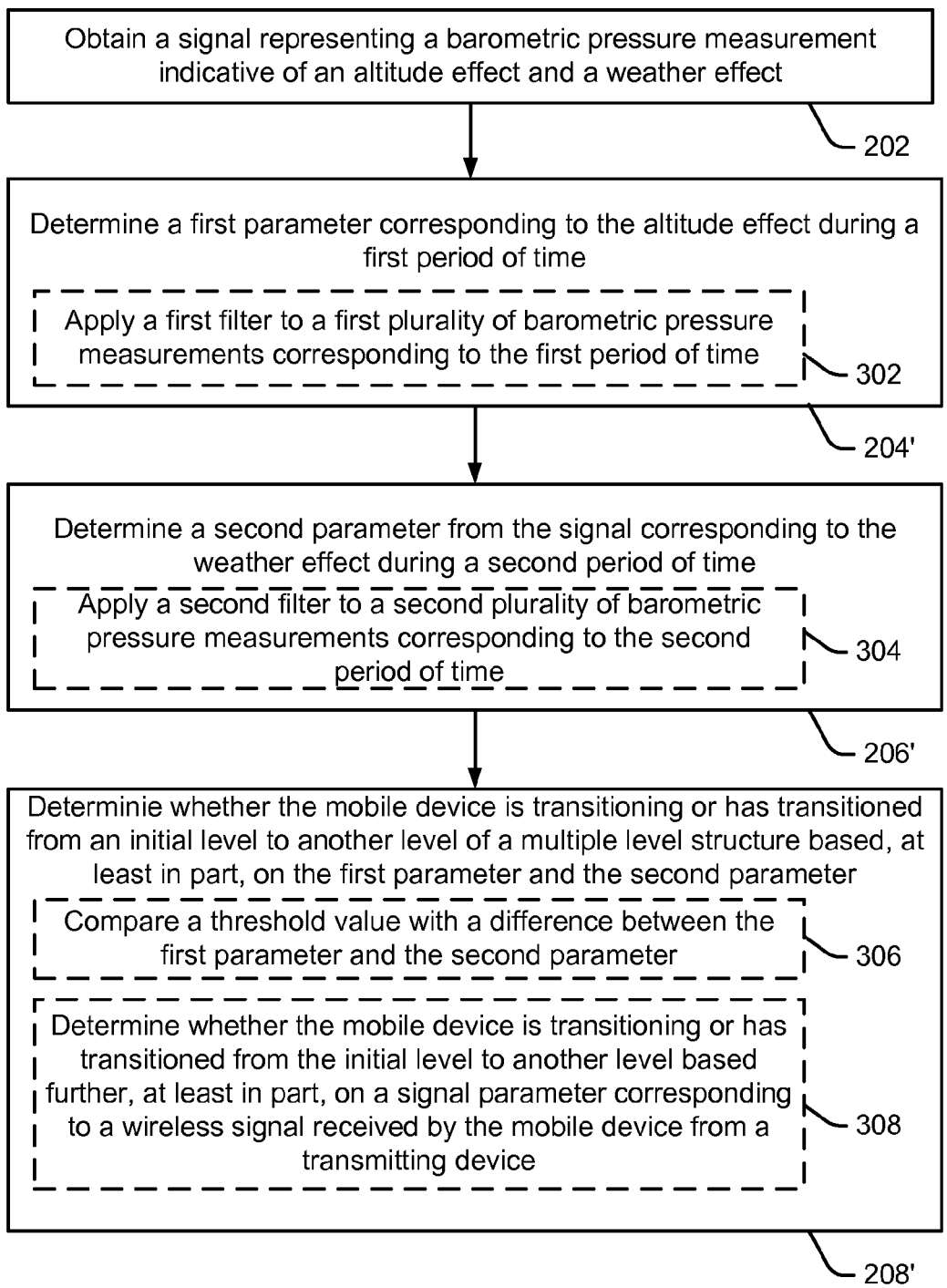

Attention is drawn next to FIG. 3, which is a flow diagram illustrating an example process 300 that may be implemented in mobile device 102 and/or apparatus 14, e.g., as in FIG. 1, to provide for positioning, at least in part, based on local barometric pressure measurements, in accordance with certain example implementations.

At example block 202, a signal representing a (local) barometric pressure measurement may be obtained, which may be indicative of an altitude effect and a weather effect.

At example block 204', a first parameter may be determined which corresponds to an altitude effect during a first period of time. In certain instances, at example block 302, a first filter and/or the like may be applied to a first plurality of barometric pressure measurements corresponding to the first period of time.

At example block 206', a second parameter may be determined which corresponds to a weather affect during a second period of time. In certain instances, at example block 304, a second filter and/or the like may be applied to a second plurality of barometric pressure measurements corresponding to the second period of time.

At example block 208', a determination may be made as to whether the mobile device is transitioning or has transitioned from an initial level to another level of a multiple level structure based, at least in part, on the first and second parameters. In certain instances, at example block 306, a threshold value may be compared with a difference between the first and the second parameter. In certain instances, at example block 308, a determination may be made as to whether the mobile device is transitioning or has transitioned from the initial level to another level based further, at least in part, on a signal parameter corresponding to a wireless signal received by the mobile device from a transmitting device.

FIG. 4 is a schematic diagram illustrating certain features of an example special purpose computing platform 400 that may be provided within mobile device 102 or apparatus 104 (FIG. 1) according to the various techniques provided herein.

As illustrated, special purpose computing platform 400 may comprise one or more processing units 402 (e.g., to perform data processing in accordance with certain techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within mobile device 102. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Special purpose computing platform 400 may, for example, further comprise one or more communication interface 408. Communication interface 408 may, for example, comprise one or more wired and/or wireless network interface units, radios, modems, etc., represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface 408 may, for example, be enabled for use with various wired communication networks, e.g., such as telephone system, a local area network, a wide area network, a personal area network, an intranet, the Internet, etc.

In accordance with certain example implementations, communication interface 408 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

Mobile device 102 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, a microphone, a camera, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, positioning and/or navigation related information, visual representations of electronic map, routing directions, etc., via a display mechanism and/or audio mechanism.

Mobile device 102 may, for example, comprise one or more sensors 416. For example, sensor(s) 416 may represent one or more environmental sensors, such as, e.g., a magnetometer or compass, a barometer or altimeter, etc., and which may be useful for positioning and/or determining a motion state. For example, sensor(s) 416 may represent one or more inertial sensors, which may be useful in detecting certain movements of mobile device 102. Thus for example, sensor(s) 416 may comprise one or more accelerometers, one or one or more gyroscopes. Further, in certain instances sensor(s) 416 may comprise and/or take the form of one or more input devices such as a sound transducer, a microphone, a camera, a light sensor, etc.

SPS receiver 418 may be capable of acquiring and acquiring SPS signals 134 via one or more antennas (not shown). SPS receiver 418 may also process, in whole or in part, acquired SPS signals 134 for estimating a position and/or a motion of mobile device 102. In certain instances, SPS receiver 418 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of mobile device 102. In certain implementations, all or part of such processing of acquired SPS signals may be performed by other processing capabilities in mobile device 102, e.g., processing unit(s) 402, memory 404, etc., in conjunction with SPS receiver 418. Storage of SPS or other signals for use in performing positioning operations may be performed in memory 404 or registers (not shown).

In certain instances, sensor(s) 416 may generate analog or digital signals that may be stored in memory 404 and processed by DPS(s) (not shown) or processing unit(s) 402 in support of one or more applications such as, for example, applications directed to positioning or navigation operations based, at least in part, on one or more positioning functions.

Processing unit(s) 402 may comprise a dedicated modem processor or the like that may be capable of performing baseband processing of signals acquired and down converted at receiver(s) 410 of communication interface 408 or SPS receiver 418. Similarly, a modem processor or the like may perform baseband processing of signals to be up converted for transmission by (wireless) transmitter(s) 412. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

In certain example implementations, mobile device 102 and/or apparatus 104 (FIG. 1) may filter barometric pressure measurements through at least a pair of filters to provide a pair of output signals (or filtered estimated altitudes). An on-going or completed transition of mobile device 102 between different levels of multiple level structure 112 may then be determined based, at least in part, on a comparison of the pair of output signals.

By way of example, attention is drawn next to FIG. 5A and FIG. 5B, which are schematic diagrams illustrating certain example filter arrangements 500 and 500', respectively, that may be implemented in mobile device 102 and/or apparatus 104, e.g., as part of example processes 200 or 300, in accordance with certain example implementations.

Example filter arrangement 500 comprises a first filter 510 and a second filter 512 illustratively arranged in parallel, each of which may be provided with a signal at an input 502 representing a barometric pressure measurement indicative of an altitude effect and a weather effect. First filter 510 may determine a first parameter corresponding to the altitude effect. For example, first filter 510 may be applied to a first plurality of barometric pressure measurements corresponding to a first period of time. Second filter 512 may determine a second parameter corresponding to the weather effect. For example, second filter 512 may be applied to a second plurality of air metric pressure measurements corresponding to a second period of time. As previously mentioned, certain instances, the second period of time may be greater than the first period of time. As shown, at an output 504 a difference may be provided between the first and second parameters may be obtained using an adder 514 and/or the like as illustrated. As mentioned, such a difference may be compared to a threshold value, e.g., to determine whether mobile device 102 is transitioning or has transitioned from an initial level to another level of a multiple level structure.

Example filter arrangement 500' comprises a second filter 512' and a first filter 510' illustratively arranged in series, wherein second filter 512' may be provided, at an input 502', with a signal representing a barometric pressure measurement indicative of an altitude effect and a weather effect. Second filter 512' may determine a second parameter corresponding to the weather effect. First filter 510' may determine a second parameter corresponding to the altitude effect. As shown, a difference 504' between the first and second parameters may be obtained using a differentiator 520 and/or the like as illustrated.

In certain example implementations, first filter 510/510' may comprise a Kalman filter (KF), a recursive least squares filter, a particle filter, and/or the like, and second filter 512/512' may comprise an exponential moving average (EMA) filter, a recursive least squares filter, a particle filter, and/or the like. In certain instances, the first and second parameters may be indicative of applicable barometric pressures and/or corresponding estimated altitudes, vertical offsets, etc. A Kalman filter and/or the like may, for example, respond more quickly to transitions of the mobile device between levels than the EMA filter and/or the like. Monitoring a difference between the first and second parameters may allow detection of on-going or completed transitions between levels of a structure. By way of a example, in certain instances a threshold value indicating a difference of 3.0 m (or corresponding barometric pressure difference, etc.) may be applied to determine whether a transition may be occurring or may have occurred. For example, if the first parameter corresponds to estimated altitude that is more than a threshold 3.0 m higher than an estimated altitude corresponding to the second parameter, it may be inferred that the position of the mobile device has transitioned to a higher altitude or level. Likewise, if the first parameter corresponds to an estimated altitude is more than 3.0 m lower than an estimated altitude corresponding to the second parameter, it may be inferred that the location of the mobile device has transitioned to a lower altitude or level.

By way of example, an EMA filter may be implemented as follows:

$$h_k = \alpha Z_k + (1-\alpha) h_{k-1}$$

where:

$Z_k$ is a current observation of barometric pressure or altitude based on a current barometric pressure measurement;

$h_k$ is the $k^{th}$ EMA estimate of altitude; and $\alpha$ represents a weight applied to the current observation. By way of example, in certain instances a default value for $\alpha$ may be set to 0.0001.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a mobile device:
   obtaining a signal representing a barometric pressure measurement indicative of an altitude effect and a weather effect;
   determining, by applying a first filter to said signal, a first parameter corresponding to said altitude effect during a first period of time;
   determining, by applying a second filter to said signal, a second parameter corresponding to said weather effect during a second period of time; and
   determining whether said mobile device is transitioning or has transitioned from an initial level to another level of a multiple level structure based, at least in part, on said first parameter and said second parameter.

2. The method as recited in claim 1, wherein said first parameter is indicative of a change in said barometric pressure measurement corresponding to a likely change in an altitude of said mobile device during said first period of time, and said second parameter is indicative of a change in said barometric pressure measurement corresponding to a likely change in an atmospheric weather condition during said second period of time.

3. The method as recited in claim 2, wherein determining said first parameter further comprises applying said first filter to a first plurality of signals representing barometric pressure measurements corresponding to said first period of time, and determining said second parameter further comprises applying said second filter to a second plurality of signals representing barometric pressure measurements corresponding to said second period of time.

4. The method as recited in claim 3, wherein said first filter comprises a Kalman filter and/or said second filter comprises an exponential moving average filter.

5. The method as recited in claim 1, wherein determining whether said mobile device is transitioning or has transitioned from said initial level to said another level of said multiple level structure further comprises comparing a threshold value with a difference between said first parameter and said second parameter.

6. The method as recited in claim 5, wherein said threshold value is based, at least in part, on an estimated location of said mobile device.

7. The method as recited in claim 5, wherein said threshold value is based, at least in part, on an electronic map representing at least a portion of said multiple level structure.

8. The method as recited in claim 1, wherein determining whether said mobile device is transitioning or has transitioned from said initial level to said another level of said multiple level structure further comprises determining whether said mobile device is transitioning or has transitioned from said initial level to said another level of said multiple level structure based, at least in part, on a signal parameter corresponding to a wireless signal received by said mobile device from a transmitting device.

9. The method as recited in claim 1, wherein said first period of time and/or said second period of time is non-contiguous.

10. The method as recited in claim 1, wherein said second period of time is longer than said first period of time.

11. The method as recited in claim 1, wherein said second period of time overlaps at least a portion of said first period of time.

12. A mobile device comprising:
    a sensor to generate a signal representing a barometric pressure measurement indicative of an altitude effect and a weather effect; and
    a processing unit to:
        determine, by an application of a first filter to said signal, a first parameter corresponding to said altitude effect during a first period of time;
        determine, by an application of a second filter to said signal, a second parameter from said signal corresponding to said weather effect during a second period of time; and
        determine whether said mobile device is transitioning or has transitioned from an initial level to another level of a multiple level structure based, at least in part, on said first parameter and said second parameter.

13. The mobile device as recited in claim 12, wherein said first parameter is indicative of a change in said barometric pressure measurement corresponding to a likely change in an altitude of said mobile device during said first period of time, and said second parameter is indicative of a change in said barometric pressure measurement corresponding to a likely change in an atmospheric weather condition during said second period of time.

14. The mobile device as recited in claim 13, said processing unit to further:
    apply said first filter to a first plurality of plurality of signals representing barometric pressure measurements corresponding to said first period of time; and apply said second filter to a second plurality of plurality of signals representing barometric pressure measurements corresponding to said second period of time.

15. The mobile device as recited in claim 14, wherein said first filter comprises a Kalman filter and/or said second filter comprises an exponential moving average filter.

16. The mobile device as recited in claim 12, said processing unit to further:
  determine whether said mobile device is transitioning or has transitioned from said initial level to said another level of said multiple level structure based, at least in part, on a comparison of a threshold value to a difference between said first parameter and said second parameter.

17. The mobile device as recited in claim 16, wherein said threshold value is based, at least in part, on: an estimated location of said mobile device; and/or an electronic map representing at least a portion of said multiple level structure.

18. The mobile device as recited in claim 12, and further comprising:
  a communication interface, and
  said processing unit to further determine whether said mobile device is transitioning or has transitioned from said initial level to said another level of said multiple level structure based, at least in part, on a signal parameter corresponding to a wireless signal received via said communication interface from a transmitting device.

19. The mobile device as recited in claim 12, wherein said first period of time and/or said second period of time is non-contiguous.

20. The mobile device as recited in claim 12, wherein said second period of time is longer than said first period of time.

21. An apparatus for use in a mobile device, the apparatus comprising:
  means for obtaining a signal representing a barometric pressure measurement indicative of an altitude effect and a weather effect;
  means for determining a first parameter, by applying a first filter means to said signal, corresponding to said altitude effect during a first period of time;
  means for determining a second parameter, by applying a second filter means to said signal, corresponding to said weather effect during a second period of time; and
  means for determining whether said mobile device is transitioning or has transitioned from an initial level to another level of a multiple level structure based, at least in part, on said first parameter and said second parameter.

22. The apparatus as recited in claim 21, wherein said first parameter is indicative of a change in said barometric pressure measurement corresponding to a likely change in an altitude of said mobile device during said first period of time, and said second parameter is indicative of a change in said barometric pressure measurement corresponding to a likely change in an atmospheric weather condition during said second period of time.

23. The apparatus as recited in claim 21, and further comprising means for comparing a threshold value with a difference between said first parameter and said second parameter.

24. The apparatus as recited in claim 21, and further comprising means for determining whether said mobile device is transitioning or has transitioned from said initial level to said another level of said multiple level structure based, at least in part, on a signal parameter corresponding to a wireless signal received by said mobile device from a transmitting device.

25. The apparatus as recited in claim 21, wherein said second period of time is longer than said first period of time.

26. An article comprising:
  a non-transitory computer readable medium having stored therein computer implementable instructions executable by a processing unit of a mobile device to:
    obtain a signal representing a barometric pressure measurement indicative of an altitude effect and a weather effect;
    determine a first parameter, by an application of a first filter to said signal, corresponding to said altitude effect during a first period of time;
    determine a second parameter, by an application of a second filter to said signal, corresponding to said weather effect during a second period of time; and
    determine whether said mobile device is transitioning or has transitioned from an initial level to another level of a multiple level structure based, at least in part, on said first parameter and said second parameter.

27. The article as recited in claim 26, wherein said first parameter is indicative of a change in said barometric pressure measurement corresponding to a likely change in an altitude of said mobile device during said first period of time, and said second parameter is indicative of a change in said barometric pressure measurement corresponding to a likely change in an atmospheric weather condition during said second period of time.

28. The article as recited in claim 26, said computer implementable instructions being further executable by said processing unit to compare a threshold value with a difference between said first parameter and said second parameter.

29. The article as recited in claim 26, said computer implementable instructions being further executable by said processing unit to determine whether said mobile device is transitioning or has transitioned from said initial level to said another level of said multiple level structure based, at least in part, on a signal parameter corresponding to a wireless signal received by said mobile device from a transmitting device.

30. The article as recited in claim 26, wherein said second period of time is longer than said first period of time.

* * * * *